March 3, 1959      F. B. BURT      2,876,052
GASKETED PISTON RING SEAL
Filed March 19, 1956
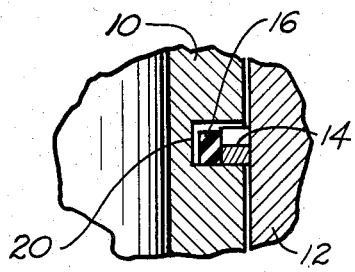
Fig.2.
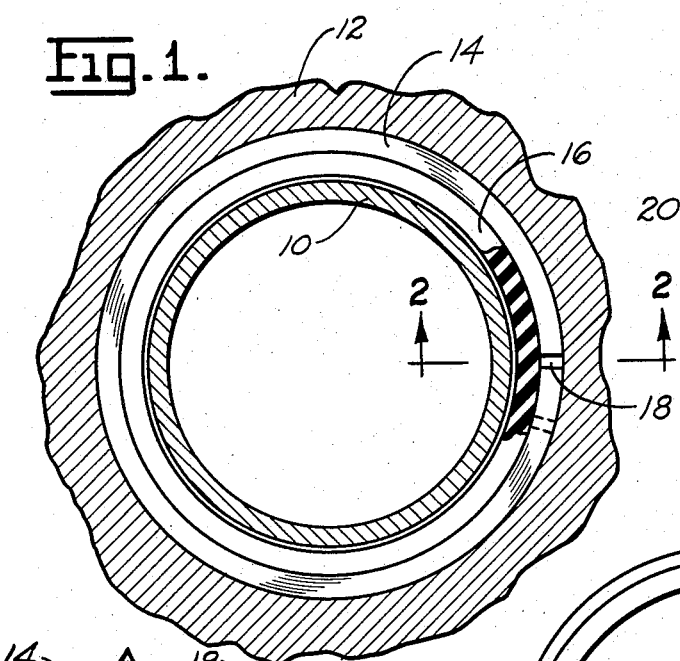
Fig.1.
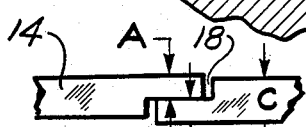
Fig.4.
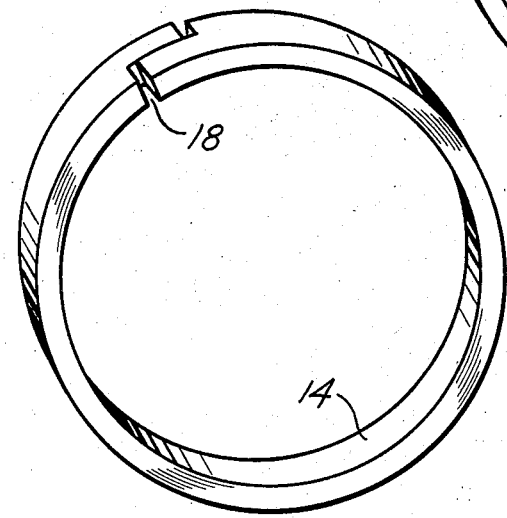
Fig.3.
Fig.5.
INVENTOR.
FARLOW B. BURT.
BY
*William N. Antonis*
ATTORNEY.

2,876,052

GASKETED PISTON RING SEAL

Farlow B. Burt, South Bend, Ind., assignor to Bendix Aviation Corporation, South Bend, Ind., a corporation of Delaware Application March 19, 1956, Serial No. 572,490

6 Claims. (Cl. 309—45)

The present invention relates to sealing means and more particularly to a gasketed piston ring for a reciprocating piston or the like.

Use of a lap joint piston ring with a rubber ring of circular cross section on the inside thereof to improve the seal is old and well known. However, it has been found that even in this type of a combination, excessive leakage occurs across the lap joint because the pressures existing in the cylinder will deform the ring of circular cross section into an amorphous mass.

It is, therefore, an object of this invention to provide a gasketed piston ring seal which would overcome this difficulty thereby improving the sealing effect of the ring assembly.

Another object of this invention is to provide a gasketed piston ring seal which would be cheaper to manufacture and assemble since the dimensions of the various components would no longer be critical.

More specifically, my invention comprises a multiple-part sealing means which includes a resilient lap joint piston ring having an interference at the point of overlap and a rubber sealing ring, having a rectangular section, on the inside of said piston ring, said sealing means having a predetermined relationship to the piston groove in which it is installed.

The above and other objects and features of the invention will become apparent from the following description taken in connection with the accompanying drawings which form a part of this specification and in which:

Figure 1 is a transverse sectional view of the present invention in a piston and cylinder assembly;

Figure 2 is a section taken on line 2—2 of Figure 1;

Figure 3 is a perspective view of the resilient lap joint piston ring;

Figure 4 is another view of the piston ring showing the interference at the point of overlap; and Figure 5 is a perspective view of the rubber ring member having a rectangular cross section.

Referring to Figures 1 to 5 it will be seen that the assembly is comprised of a piston 10, a cylinder 12, a lap joint piston ring 14, and a rubber ring 16.

The lap joint piston ring 14 is step cut at 18 so that an interference on the widths is provided. That is, the widths A plus B of the step joint should be equal to or greater than the width C of piston ring 14. This interference is necessary in order to guarantee the prevention of gaps between A and B. With normal manufacturing methods, a conventional lap joint ring, lacking interference, more often than not permits leakage through the middle. Use of a standard rubber ring of circular cross section is not of much assistance since the pressures in the cylinder deform the ring to such an extent that leakage occurs through the step joint. Admittedly, under normal applications interference on the widths is highly undesirable because of the excessive side leakage. However, by using a rubber ring having a rectangular section in combination with the piston ring having interference, leakage is prevented through both the middle and side of the lap joint. The rectangular shape of the rubber ring is maintained by using a ring having an internal diameter which is greater than the diameter of the annular groove 20 and a width which is less than the width of said groove. As a result fluid pressure will be exerted against the side and bottom of the rubber ring 16 in such a manner that the rectangular shape of the rubber ring will be retained, thereby preventing leakage through the step joint 18. The width of the rubber ring must be such that there is contact over more than half the width of the piston ring 14.

By using the instant piston ring assembly, ring gap is no longer critical nor is side finish or squareness of the edges. A further saving in the piston ring assembly may be made by using extruded stock for the rubber gasket and cutting it to the proper lengths so that the ends abut. The extruded stock can be cut to any length and can therefore be used in different size piston rings.

It will be appreciated that the gasketed piston ring assembly may be used with any conventional type of reciprocating piston. Furthermore, the described sealing combination has a long life and provides a vastly improved sealing means at a minimum of expense.

The several practical advantages which flow from this gasketed piston ring seal are belived to be obvious from the above, and other advantages may suggest themselves to those who are familiar with the art to which this invention relates.

Having thus described the various features of the invention, what I claim as new and desire to secure by Letters Patent is:

1. A sealing means located in an annular groove of a reciprocating member, comprising a resilient metallic lap joint ring member, said ring member being step cut at the joint so that an interference on the widths is provided, and a closed resilient rubber like ring of substantially rectangular cross section arranged within said lap joint ring member for effecting sealing engagement, said rubber like ring having a width greater than one half the width of the lap joint ring member but less than the width of said annular groove and an internal diameter which is greater than the diameter of said groove.

2. A sealing means located in a groove of a reciprocating member, comprising a lap joint member, said member being step cut at the joint so that an interference on the widths is provided, and a resilient member of substantially rectangular cross section arranged within said lap joint member for effecting sealing engagement, said resilient member having a predetermined clearance between the bottom and one side of said groove and a width greater than one half the width of the lap joint member.

3. A sealing means located in an annular groove of a reciprocating member, comprising a resilient lap joint ring member, said ring member being step cut at the joint so that an interference on the widths is provided, a resilent ring of substantially rectangular cross section arranged within said lap joint ring member for effecting sealing engagement, said resilient ring being positioned away from the bottom and one side of said groove.

4. A sealing means located in an annular groove of a reciprocating member, comprising a resilient lap joint ring member, said ring member being step cut at the joint so that an interference on the widths is provided, and a resilient member of substantially rectangular cross section adapted for sealing engagement with the inner periphery of said lap joint ring member and one side wall of said groove.

5. A sealing means comprising a resilient lap joint ring member, said ring member being step cut at the joint so that an interference on the widths is provided, and a resilient rubber-like ring of substantially rectangular cross section arranged within said lap joint ring member for effecting sealing engagement.

6. A sealing means comprising a resilient lap joint member, said member being step cut at the joint so that an interference on the widths is provided, and a resilient rubber like strip of substantially rectangular cross section arranged within said lap joint member and assuming the shape of said lap joint member so as to effect sealing engagement.

References Cited in the file of this patent

UNITED STATES PATENTS

| 1,239,726 | Sauer et al. | Sept. 11, 1917 |
| 2,607,644 | Smith et al. | Aug. 19, 1952 |
| 2,774,639 | Naab | Dec. 18, 1956 |

FOREIGN PATENTS

| 927,620 | France | May 5, 1947 |